(12) United States Patent
Kim et al.

(10) Patent No.: US 10,711,075 B2
(45) Date of Patent: Jul. 14, 2020

(54) METHOD OF PREPARING RUBBER COMPOSITION INCLUDING SYNDIOTACTIC 1,2-POLYBUTADIENE

(71) Applicant: Korea Kumho Petrochemical Co., Ltd., Seoul (KR)

(72) Inventors: Jae Yun Kim, Daejeon (KR); Yeong Min Jung, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 188 days.

(21) Appl. No.: 16/033,810

(22) Filed: Jul. 12, 2018

(65) Prior Publication Data

US 2019/0023815 A1 Jan. 24, 2019

(30) Foreign Application Priority Data

Jul. 21, 2017 (KR) .......................... 10-2017-0092406

(51) Int. Cl.

| | |
|---|---|
| *C08F 2/60* | (2006.01) |
| *C08F 36/06* | (2006.01) |
| *C08F 36/08* | (2006.01) |
| *C08F 36/04* | (2006.01) |
| *C08F 4/602* | (2006.01) |
| *C08F 4/609* | (2006.01) |
| *C08L 9/00* | (2006.01) |
| *B60C 1/00* | (2006.01) |
| *C08F 4/12* | (2006.01) |
| *C08F 236/06* | (2006.01) |
| *C08L 51/04* | (2006.01) |
| *C08L 7/00* | (2006.01) |
| *C08F 4/70* | (2006.01) |

(Continued)

(52) U.S. Cl.
CPC .............. *C08F 2/60* (2013.01); *B60C 1/0016* (2013.01); *C08F 2/001* (2013.01); *C08F 4/12* (2013.01); *C08F 4/545* (2013.01); *C08F 4/602* (2013.01); *C08F 4/6097* (2013.01); *C08F 4/70* (2013.01); *C08F 36/045* (2013.01); *C08F 36/06* (2013.01); *C08F 36/08* (2013.01); *C08F 236/06* (2013.01); *C08F 279/02* (2013.01); *C08L 7/00* (2013.01); *C08L 9/00* (2013.01); *C08L 51/04* (2013.01); *C08F 2/06* (2013.01)

(58) Field of Classification Search
CPC .... C08L 9/00; C08F 2/60; C08F 36/06; C08F 36/08; C08F 36/045; C08F 4/602; C08F 4/6097; B60C 1/0016
See application file for complete search history.

(56) References Cited

U.S. PATENT DOCUMENTS 5,118,748 A * 6/1992 Fujita ..................... C08K 3/22
522/111
5,268,439 A * 12/1993 Hergenrother ........ C07F 7/2288
526/340

(Continued)

*Primary Examiner* — Robert D Harlan
(74) *Attorney, Agent, or Firm* — Novick, Kim & Lee, PLLC; Jae Youn Kim

(57) ABSTRACT

Provided is a method of preparing a rubber composition, which includes (a) reacting a conjugated diene-based monomer with one or more of compounds in the presence of a first catalyst; (b) adding a conjugated diene-based monomer to a product of the step (a) and inducing a reaction; and (c) adding a second catalyst and a conjugated diene-based monomer to a product of the step (b) and inducing a reaction.

13 Claims, 1 Drawing Sheet

(51) Int. Cl.
*C08F 279/02* (2006.01)
*C08F 4/54* (2006.01)
*C08F 2/00* (2006.01)
*C08F 2/06* (2006.01)

(56) References Cited

U.S. PATENT DOCUMENTS 10,035,908 B1 * 7/2018 Luo .................... C08L 47/00
2017/0137598 A1 * 5/2017 Takenaka ............ C08C 19/25

* cited by examiner

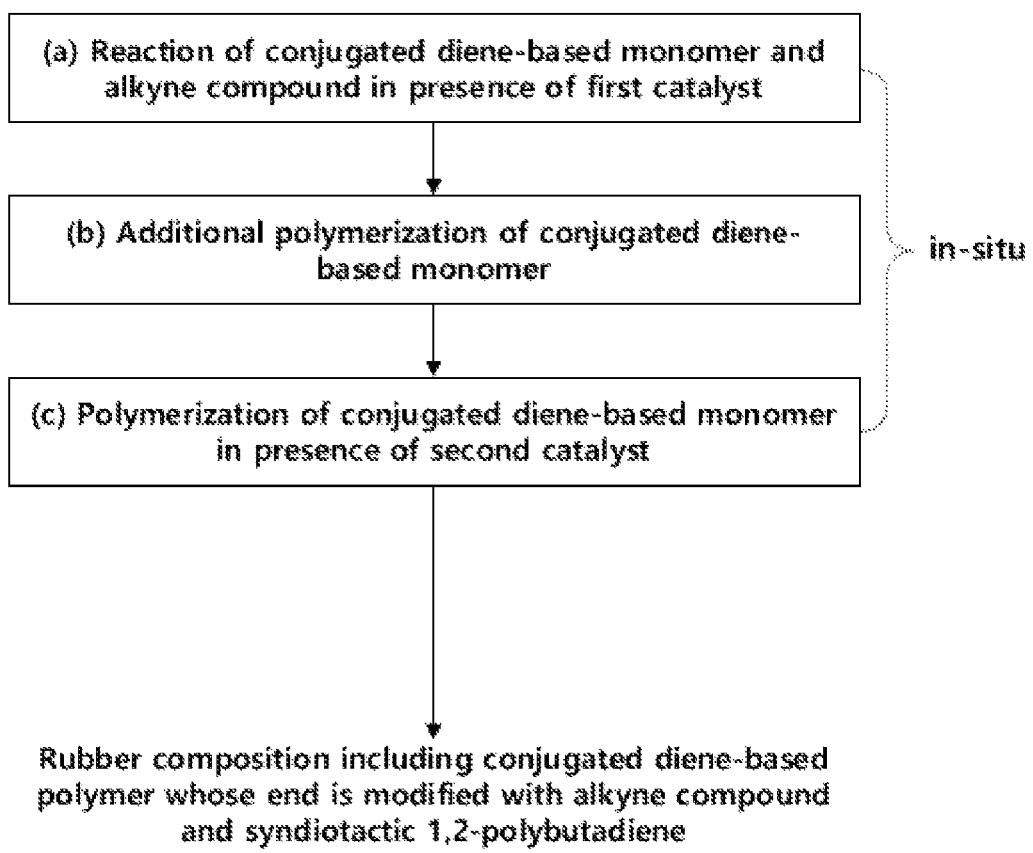

METHOD OF PREPARING RUBBER COMPOSITION INCLUDING SYNDIOTACTIC 1,2-POLYBUTADIENE

CROSS-REFERENCE TO RELATED APPLICATION

This application claims priority to and the benefit of Korean Patent Application No. 10-2017-0092406, filed on Jul. 21, 2017, the disclosure of which is incorporated herein by reference in its entirety.

BACKGROUND

1. Field of the Invention

The present invention relates to a method of preparing a rubber composition including syndiotactic 1,2-polybutadiene, and more particularly, to a method of preparing a rubber composition including syndiotactic 1,2-polybutadiene dispersed in a base rubber consisting of an end-modified conjugated diene-based polymer.

2. Discussion of Related Art

Syndiotactic 1,2-polybutadiene is a crystalline polymer with a stereoregular structure in which a vinyl group of the side chain alternate on two opposing sides of the main chain of a polymer. Syndiotactic 1,2-polybutadiene is a unique material in that it exhibits the properties of both plastic and rubber, and thus is applied in various fields. For example, syndiotactic 1,2-polybutadiene may be used to manufacture a film, a fiber, and various molded articles, and may also be used in combination with a natural or synthetic rubber.

It is widely known that a blend of a crystalline polymer and a rubber can improve the properties of a material into which the blend is mixed. For example, when syndiotactic 1,2-polybutadiene is mixed with a rubber composition for tire tread, heat generation is reduced so that fuel efficiency of the tire can be improved.

The blend of a crystalline polymer and a rubber is prepared using a common mixing device such as a mixer, an extruder, or a kneader. However, in this case, there is a problem of a cost increase, degradation and crosslinking of a polymer, inappropriate mixing, and processability degradation, and particularly, the degradation and crosslinking of a polymer, which are caused by the high vinyl content of syndiotactic 1,2-polybutadiene, may impede the high-temperature mixing of syndiotactic 1,2-polybutadiene and a rubber.

For this reason, a method of preparing a blend of rubber cement and syndiotactic 1,2-polybutadiene by polymerizing 1,3-butadiene in rubber cement in the presence of a predetermined catalyst to form syndiotactic 1,2-polybutadiene has been proposed, but there is still a problem of inefficiency and toxicity of the catalyst.

In addition, when the blend thus prepared is used in combination with a reinforcing filler such as carbon black, dispersibility of the reinforcing filler is degraded due to a low affinity and compatibility of rubber cement for the reinforcing filler, and accordingly, it is difficult to harmoniously implement mechanical properties according to the reinforcing filler and fuel efficiency according to syndiotactic 1,2-polybutadiene.

SUMMARY OF THE INVENTION

The present invention is designed to solve the problems of the prior art, and it is an object of the present invention to provide a method of preparing a rubber composition including syndiotactic 1,2-polybutadiene, which has improved compatibility and affinity for a reinforcing filler and thus is capable of improving the properties of a product by including a reinforcing filler.

According to one aspect of the present invention, there is provided a method of preparing a rubber composition, which includes (a) reacting a conjugated diene-based monomer with one or more of compounds represented by the following Chemical Formulas 1 and 2 in the presence of a first catalyst; (b) adding a conjugated diene-based monomer to a product of the step (a) and inducing a reaction; and (c) adding a second catalyst and a conjugated diene-based monomer to a product of the step (b) and inducing a reaction.

  <Chemical Formula 1>

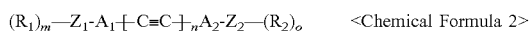  <Chemical Formula 2>

In Chemical Formulas 1 and 2, $R_1$ and $R_2$ each are a C1 to C20 alkyl, aryl, or alkoxy group, —NR'R", —SiR'R"R'", or hydrogen, wherein R', R", and R'" each are a C1 to C20 alkyl, aryl, or alkoxy group, or hydrogen; m and o each are an integer of 0 to 3; $Z_1$ and $Z_2$ each are silicon, tin, nitrogen, oxygen, sulfur, phosphorus, carbon, or hydrogen; $A_1$ and $A_2$ each are a C1 to C20 alkylene or arylene group; and n is an integer of 1 to 20.

According to an embodiment, the first catalyst may be a neodymium-based catalyst prepared from a monomeric neodymium salt compound.

According to an embodiment, the monomeric neodymium salt compound may be one or more selected from the group consisting of neodymium hexanoate, neodymium heptanoate, neodymium octanoate, neodymium octoate, neodymium naphthenate, neodymium stearate, neodymium versatate, neodymium bis(2-ethylhexyl) phosphate, neodymium bis(1-methylheptyl) phosphate, neodymium (mono-2-ethylhexyl-2-ethylhexyl) phosphonate, and neodymium bis(2-ethylhexyl) phosphite.

According to an embodiment, in the step (a), a molar ratio of the monomeric neodymium salt compound and the conjugated diene-based monomer may be 1:5 to 30.

According to an embodiment, in the step (a), a molar ratio of the monomeric neodymium salt compound and the compounds represented by Chemical Formulas 1 and 2 may be 1:1 to 10.

According to an embodiment, the conjugated diene-based monomer may be one or more selected from the group consisting of 1,3-butadiene, isoprene, 2,3-dimethyl-1,3-butadiene, 2,3-dimethylbutadiene, 2-phenyl-1,3-butadiene, 2-chloro-1,3-butadiene, 1,3-pentadiene, 2-methyl-1,3-pentadiene, 3-methyl-1,3-pentadiene, 4-methyl-1,3-pentadiene, 1,3-hexadiene, 2-ethyl-1,3-butadiene, 2,4-hexadiene, and cyclo-1,3-hexadiene.

According to an embodiment, the second catalyst may include an organoaluminum compound, a phosphorus compound, and a transition metal complex.

According to an embodiment, the second catalyst may include 15 to 40 equivalents of the organoaluminum compound and 1 to 15 equivalents of the phosphorus compound with respect to 1 equivalent of the transition metal complex.

According to an embodiment, the organoaluminum compound may be one or more selected from the group consisting of trimethylaluminum, triethylaluminum, tripropylaluminum, tributylaluminum, triisobutylaluminum, trihexylaluminum, and diisobutylaluminum hydride.

According to an embodiment, the phosphorus compound may be a phosphite, a phosphate, or a mixture thereof.

According to an embodiment, the transition metal complex may be an iron carboxylate or an iron acetylacetonate.

According to an embodiment, the steps (a) to (c) may be carried out in situ.

According to an embodiment, a product of the step (c) may include 60 to 90 wt % of an end-modified conjugated diene-based polymer and 10 to 40 wt % of syndiotactic 1,2-polybutadiene.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a schematic diagram of a method of preparing a rubber composition according to one aspect of the present invention.

DETAILED DESCRIPTION OF EXEMPLARY EMBODIMENTS

Hereinafter, exemplary embodiments of the present invention will be described in detail with reference to accompanying drawings. However, it should be understood that the present invention can be implemented in various forms, and that it is not intended to limit the present invention to the exemplary embodiments. Also, in the drawings, descriptions of parts unrelated to the detailed description are omitted to clearly describe the present invention. Throughout the specification, like numbers refer to like elements.

Throughout the specification, a certain part being "connected" to one other part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

FIG. 1 is a schematic diagram of a method of preparing a rubber composition according to one aspect of the present invention.

Referring to FIG. 1, a method of preparing a rubber composition according to one aspect of the present invention may include (a) reacting a conjugated diene-based monomer with one or more of alkyne compounds represented by the following Chemical Formulas 1 and 2 in the presence of a first catalyst; (b) adding a conjugated diene-based monomer to a product of the step (a) and inducing a reaction; and (c) adding a second catalyst and a conjugated diene-based monomer to a product of the step (b) and inducing a reaction.

$(R_1)_m-Z_1-[C≡C]_n-Z_2-(R_2)_o$  <Chemical Formula 1>

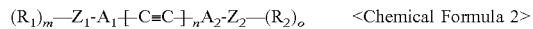
$(R_1)_m-Z_1-A_1-[C≡C]_n-A_2-Z_2-(R_2)_o$  <Chemical Formula 2>

In Chemical Formulas 1 and 2, $R_1$ and $R_2$ each are a C1 to C20 alkyl, aryl, or alkoxy group, —NR'R", —SiR'R"R'", or hydrogen, wherein R', R", and R'" each are a C1 to C20 alkyl, aryl, or alkoxy group, or hydrogen; m and o each are an integer of 0 to 3; $Z_1$ and $Z_2$ each are silicon, tin, nitrogen, oxygen, sulfur, phosphorus, carbon, or hydrogen; $A_1$ and $A_2$ each are a C1 to C20 alkylene or arylene group; and n is an integer of 1 to 20.

In the step (a), a conjugated diene-based monomer may be reacted with one or more of alkyne compounds represented by Chemical Formulas 1 and 2 in the presence of a first catalyst to induce bonding of a small amount of the conjugated diene-based monomer and any one of the alkyne compounds at an active site of the catalyst. The alkyne compound may be bonded with the conjugated diene-based monomer during an initial stage of polymerization of the conjugated diene-based monomer to functionalize one end of the conjugated diene-based polymer.

The compounds represented by Chemical Formulas 1 and 2 are alkyne compounds bonded with silicon, tin, nitrogen, oxygen, sulfur, phosphorus, or the like.

When n is 1, examples of the compound represented by Chemical Formula 1 include bis(trialkylstannyl)acetylene, bis(trioctylstannyl)acetylene, bis(tributylstannyl)acetylene, bis(triisopropylstannyl)acetylene, bis(triethylstannyl)acetylene, bis(trimethylstannyl)acetylene, bis(dialkylamino)acetylene, bis(dioctylamino)acetylene, bis(dibutylamino)acetylene, bis(isopropylamino)acetylene, bis(diethylamino)acetylene, bis(dimethylamino)acetylene, bis(N,N-bis(trimethylsilyl)amino)acetylene, bis(alkyloxy)acetylene, bis(octyloxy)acetylene, bis(butoxy)acetylene, bis(isopropyloxy)acetylene, bis(diethoxy)acetylene, bis(dimethoxy)acetylene, bis(trialkylsilyl)acetylene, bis(trioctylsilyl)acetylene, bis(trimethylsilyloxy)acetylene, bis(tributylsilyl)acetylene, bis(triisopropylsilyl)acetylene, bis(triethylsilyl)acetylene, bis(trimethylsilyl)acetylene, bis(trialkoxysilyl)acetylene, bis(tributoxysilyl)acetylene, bis(triisopropyloxysilyl)acetylene, bis(triethoxysilyl)acetylene, bis(trimethylsilyl)acetylene, and the like, but the present invention is not limited thereto.

When n is 2, examples of the compound represented by Chemical Formula 1 include 1,4-bis(trialkylstannyl)butadiyne, 1,4-bis(trioctylstannyl)butadiyne, 1,4-bis(tributylstannyl)butadiyne, 1,4-bis(triisopropylstannyl)butadiyne, 1,4-bis(triethylstannyl)butadiyne, 1,4-bis(trimethylstannyl)butadiyne, 1,4-bis(dialkylamino)butadiyne, 1,4-bis(dioctylamino)butadiyne, 1,4-bis(dibutylamino)butadiyne, 1,4-bis(isopropylamino)butadiyne, 1,4-bis(diethylamino)butadiyne, 1,4-bis(dimethylamino)butadiyne, 1,4-bis(N,N-bis(trimethylsilyl)amino)butadiyne, 1,4-bis(alkyloxy)butadiyne, 1,4-bis(octyloxy)butadiyne, 1,4-bis(butoxy)butadiyne, 1,4-bis(isopropyloxy)butadiyne, 1,4-bis(diethoxy)butadiyne, 1,4-bis(dimethoxy)butadiyne, 1,4-bis(trimethylsilyloxy)butadiyne, 1,4-bis(trialkylsilyl)butadiyne, 1,4-bis(trioctylsilyl)butadiyne, 1,4-bis(tributylsilyl)butadiyne, 1,4-bis(triisopropylsilyl)butadiyne, 1,4-bis(triethylsilyl)butadiyne, 1,4-bis(trimethylsilyl)butadiyne, 1,4-bis(trialkoxysilyl)butadiyne, 1,4-bis(tributoxysilyl)butadiyne, 1,4-bis(triisopropyloxysilyl)butadiyne, 1,4-bis(triethoxysilyl)butadiyne, 1,4-bis(trimethylsilyl)butadiyne, and the like, but the present invention is not limited thereto.

In addition, when $Z_1$ is hydrogen (H), examples of the compound represented by Chemical Formula 1 include trialkylstannylacetylene, trioctylstannylacetylene, tributylstannylacetylene, triisopropylstannylacetylene, triethylstannylacetylene, trimethylstannylacetylene, dialkylaminoacetylene, dioctylaminoacetylene, dibutylaminoacetylene, isopropylaminoacetylene, diethylaminoacetylene, dimethylaminoacetylene, N,N-bis(trimethylsilyl)aminoacetylene, alkyloxyacetylene, octyloxyacetylene, butoxyacetylene, isopropyloxyacetylene, diethoxyacetylene, dimethoxyacetylene, trimethylsilyloxyacetylene, trialkylsilylacetylene, trioctylsilylacetylene, tributylsilylacetylene, triisopropylsilylacetylene, triethylsilylacetylene, trimethylsilylacetylene, trialkoxysilylacetylene, tributoxysilylacetylene, triisopropyloxysilylacetylene, triethoxysilylacetylene, trimethylsilyl acetylene, acetylene, trialkylstannyl-2-propyne, trioctylstannyl-2-propyne, tributylstannyl-2-propyne, triisopropylstannyl-2-propyne, triethylstannyl-2-propyne, trimethylstannyl-2-propyne, dialkylamino-2-propyne, dioctylamino-2-prop yne, dibutylamino-2-propyne, isopropylamino-2-propyne, diethylamino-2-propyne, dimethylamino-2-propyne, N,N-bis(trimethylsilyl)amino-2-propyne, alkyloxy-2-propyne, octyloxy-2-propyne, butoxy-2-propyne, isopropyloxy-2-propyne, diethoxy-2-propyne, dimethoxy-2-propyne, trimethylsilyloxy-2-propyne, trialkylsilyl-2-propyne, trioctylsilyl-2-propyne, tributylsilyl-2-propyne, triisopropylsilyl-2-propyne, triethylsilyl-2-propyne, trimethylsilyl-2-propyne, trialkoxysilyl-2-propyne, tributoxysilyl-2-propyne, triisopropyloxysilyl-2-propyne, triethoxysilyl-2-propyne, trimethylsilyl-2-propyne, and the like, but the present invention is not limited thereto.

Examples of the compound represented by Chemical Formula 2 include 1,4-bis(trialkylstannyl)-2-butyne, 1,4-bis(trioctylstannyl)-2-butyne, 1,4-bis(tributylstannyl)-2-butyne, 1,4-bis(triisopropylstannyl)-2-butyne, 1,4-bis(triethylstannyl)-2-butyne, 1,4-bis(trimethylstannyl)-2-butyne, 1,4-bis(dialkylamino)-2-butyne, 1,4-bis(dioctylamino)-2-butyne, 1,4-bis(dibutylamino)-2-butyne, 1,4-bis(isopropyl)amino-2-butyne, 1,4-bis(diethyl)amino-2-butyne, 1,4-bis(dimethylamino)-2-butyne, 1,4-bis(N,N-bis(trimethylsilyl)amino)-2-butyne, 1,4-bis(alkyloxy)-2-butyne, 1,4-bis(octyloxy)-2-butyne, 1,4-bis(butoxy)-2-butyne, 1,4-bis(isopropyloxy)-2-butyne, 1,4-bis(diethoxy)-2-butyne, 1,4-bis(dimethoxy)-2-butyne, 1,4-bis(trimethylsilyloxy)butyne, 1,4-bis(trialkylsilyl)-2-butyne, 1,4-bis(trioctylsilyl)-2-butyne, 1,4-bis(tributylsilyl)-2-butyne, 1,4-bis(triisopropylsilyl)-2-butyne, 1,4-bis(triethylsilyl)-2-butyne, 1,4-bis(trimethylsilyl)-2-butyne, 1,4-bis(trialkoxysilyl)-2-butyne, 1,4-bis(tributoxysilyl)-2-butyne, 1,4-bis(triisopropyloxysilyl)-2-butyne, 1,4-bis(triethoxysilyl)-2-butyne, 1,4-bis(trimethylsilyl)-2-butyne, and the like, but the present invention is not limited thereto.

The first catalyst may be a neodymium-based catalyst prepared from a monomeric neodymium salt compound. The term "neodymium-based catalyst" used herein refers to a compound prepared by coordinate bonding between a central metal ion and ligands. The monomeric neodymium salt compound may be one or more selected from the group consisting of neodymium hexanoate, neodymium heptanoate, neodymium octanoate, neodymium octoate, neodymium naphthenate, neodymium stearate, neodymium versatate, neodymium bis(2-ethylhexyl) phosphate, neodymium bis(1-methylheptyl) phosphate, neodymium (mono-2-ethylhexyl-2-ethylhexyl) phosphonate, and neodymium bis(2-ethylhexyl) phosphite, and is preferably neodymium versatate, but the present invention is not limited thereto.

Specifically, the neodymium-based catalyst may be a catalyst prepared by mixing the neodymium salt compound, an organoaluminum chloride compound, and one or more organoaluminum compounds at a predetermined molar ratio, for example, at a molar ratio of 1:1 to 5:20 to 30, followed by aging under predetermined conditions.

A solvent used to prepare the catalyst may be a non-polar solvent having no reactivity with the catalyst, aliphatic hydrocarbon, cycloaliphatic hydrocarbon, benzene, ethylbenzene, toluene, xylene, or the like, for example, pentane, hexane, isopentane, heptane, octane, isooctane, cyclopentane, methylcyclopentane, cyclohexane, methylcyclohexane, or ethylcyclohexane, but the present invention is not limited thereto.

The organoaluminum chloride compound may be diethylaluminum chloride, dimethylaluminum chloride, dipropylaluminum chloride, diisobutylaluminum chloride, dihexylaluminum chloride, dioctylaluminum chloride, ethylaluminum dichloride, methylaluminum dichloride, propylaluminum dichloride, isobutylaluminum dichloride, hexylaluminum dichloride, octylaluminum dichloride, ethylaluminum sesquichloride, methylaluminum sesquichloride, propylaluminum sesquichloride, isobutylaluminum sesquichloride, hexylaluminum sesquichloride, or octylaluminum sesquichloride. The organoaluminum compound or organoaluminoxane may be one or more selected from the group consisting of trimethylaluminum, triethylaluminum, tripropylaluminum, tributylaluminum, triisobutylaluminum, trihexylaluminum, trioctylaluminum, diisobutylaluminum hydride, dimethylaluminum hydride, diethylaluminum hydride, dipropylaluminum hydride, dibutylaluminum hydride, diisobutylaluminum hydride, dihexylaluminum hydride, dioctylaluminum hydride, methylaluminoxane (MAO), modified methylaluminoxane (MMAO), ethylaluminoxane, propylaluminoxane, isobutylaluminoxane, isobutylaluminoxane, hexylaluminoxane, and octylaluminoxane, but the present invention is not limited thereto.

In the step (a), a molar ratio of the monomeric neodymium salt compound and the conjugated diene-based monomer may be 1:5 to 30, and a molar ratio of the monomeric neodymium salt compound and the compounds represented by Chemical Formulas 1 and 2 may be 1:1 to 10. When a molar ratio of the individual reactants used in the step (a) does not satisfy the above ranges, it is difficult to introduce the alkyne compound to a specific site (specifically, one end (head)) of a high-cis conjugated diene-based polymer, substitute the same site with the alkyne compound, and thus functionalize the same site.

The conjugated diene-based monomer may be one or more selected from the group consisting of 1,3-butadiene, isoprene, 2,3-dimethyl-1,3-butadiene, 2,3-dimethylbutadiene, 2-phenyl-1,3-butadiene, 2-chloro-1,3-butadiene, 1,3-pentadiene, 2-methyl-1,3-pentadiene, 3-methyl-1,3-pentadiene, 4-methyl-1,3-pentadiene, 1,3-hexadiene, 2-ethyl-1,3-butadiene, 2,4-hexadiene, and cyclo-1,3-hexadiene, and is preferably 1,3-butadiene or isoprene, but the present invention is not limited thereto.

When a conjugated diene-based monomer, for example, 1,3-butadiene is additionally added to a product of the step (a) and inducing additional polymerization in the step (b), high-cis-1,4-polybutadiene including 90 wt %, preferably 95 wt % or more, of cis-1,4-butadiene is produced. The high-cis-1,4-polybutadiene may have a linear molecular chain structure.

In general, a product manufactured from high-cis-1,4-polybutadiene has excellent mechanical properties. However, high-cis-1,4-polybutadiene exhibits low processability due to high viscosity and does not have a functional group compatible with a filler such that dispersibility of the filler may not be maximized, and thus a final product manufactured therefrom may have poor dynamic properties.

In this regard, one end of high-cis-1,4-polybutadiene produced in the step (b) is functionalized by the alkyne compounds represented by Chemical Formulas 1 and 2, so that when the composition is used in a combination with a filler, the affinity and compatibility thereof for a filler and the dispersibility of a filler are improved, and, at the same time, mechanical and dynamic properties of a final product may be harmoniously implemented.

In the step (c), a second catalyst and a conjugated diene-based monomer may be added to a solution including a product of the step (b) (i.e., high-cis-1,4-polybutadiene whose end is modified with the alkyne compound) and then subjected to solution polymerization to obtain a rubber composition including end-modified 1,4-polybutadiene and syndiotactic 1,2-polybutadiene. Specifically, a rubber composition including end-modified 1,4-polybutadiene and syndiotactic 1,2-polybutadiene may be obtained by removing the solvent used as a polymerization medium, after the solution polymerization.

The second catalyst may include an organoaluminum compound, a phosphorus compound, and a transition metal complex.

The organoaluminum compound may be one or more selected from the group consisting of trimethylaluminum, triethylaluminum, tripropylaluminum, tributylaluminum, triisobutylaluminum, trihexylaluminum, and diisobutylaluminum hydride, and is preferably triisobutylaluminum, but the present invention is not limited thereto.

The phosphorus compound may be a phosphite, a phosphate, or a mixture thereof. Examples of the phosphite include hydrogen diisopropyl phosphite, hydrogen diisobutyl phosphite, hydrogen dihexyl phosphite, hydrogen dioctyl phosphite, hydrogen dinonyl phosphite, hydrogen dicyclohexyl phosphite, triisopropyl phosphite, diisopropyloctyl phosphite, diisopropylnonyl phosphite, diisopropyldodecyl phosphite, dibutyloctyl phosphite, dibutylcyclohexyl phosphite, dibutylnonyl phosphite, dibutyldodecyl phosphite, tributyl phosphite, triisobutyl phosphite, trihexyl phosphite, trioctyl phosphite, bis(2-ethylhexyl) phosphite, and the like, but the present invention is not limited thereto. Also, examples of the phosphate include triphenyl phosphate, ethyl diphenyl phosphate, diethyl phenyl phosphate, triethyl phosphate, and the like, but the present invention is not limited thereto.

The transition metal complex may be an iron carboxylate or an iron acetylacetonate. Examples of the iron carboxylate include iron(II) formate, iron(III) formate, iron(II) acetate, iron(III) acetate, iron(II) acrylate, iron(III) acrylate, iron(II) methacrylate, iron(III) methacrylate, iron(II) valerate, iron (III) valerate, iron(II) gluconate, iron(III) gluconate, iron(II) citrate, iron(III) citrate, iron(II) fumarate, iron(III) fumarate, iron(II) lactate, iron(III) lactate, iron(II) malate, iron(III) malate, iron(II) oxalate, iron(III) oxalate, iron(II) 2-ethylhexanoate, iron(III) 2-ethylhexanoate, iron(II) neodecanoate, iron(III) neodecanoate, iron(II) stearate, iron(III) stearate, iron(II) oleate, iron(III) oleate, iron(II) benzoate, iron (III) benzoate, iron(II) picolinate, iron(III) picolinate, and the like, but the present invention is not limited thereto.

The second catalyst may include 15 to 40 equivalents of the organoaluminum compound and 1 to 15 equivalents of the phosphorus compound with respect to 1 equivalent of the transition metal complex. When the components and composition ratio of the second catalyst do not satisfy the above ranges, a desired level of syndiotactic 1,2-polybutadiene properties may not be implemented.

In the step (c), the individual components included in the second catalyst may be separately added directly to a reactor, or the components may be completely or partially mixed with one another elsewhere and then added to the reactor. Also, when the components of the second catalyst are added to the reactor after being mixed elsewhere, a portion of the second catalyst may be added to the reactor first, and the remainder may be mixed and then added to the reactor. For example, a portion of the phosphorus compound used in the step (c) may be first added to the product of the step (b), the remainder may be mixed with a solvent and a transition metal complex in a separate container to form a solution, and then the solution may be added to the product of the step (b).

The rubber composition may include 60 to 90 wt % of an end-modified conjugated diene-based polymer and 10 to 40 wt % of syndiotactic 1,2-polybutadiene.

The syndiotactic-1,2-polybutadiene may maintain the strength of the rubber composition at a predetermined level or more. Also, when the rubber composition is used in a combination with a filler, the syndiotactic-1,2-polybutadiene may contribute to lowering of the specific gravity of the blend, and thus the weight of a product manufactured using the blend may be reduced.

The vinyl content in the syndiotactic-1,2-polybutadiene may be about 70% or more, preferably, about 90% or more. Also, the syndiotactic-1,2-polybutadiene may have the degree of crystallinity of 30% or more, preferably, 40% or more. The syndiotactic-1,2-polybutadiene may have a melting point of 110 to 220° C., preferably, 140 to 180° C.

The syndiotactic-1,2-polybutadiene may be included in an amount of 10 to 40 wt % with respect of the total weight of the rubber composition. When the content of the syndiotactic 1,2-polybutadiene is less than 10 wt %, the mechanical strength when the rubber composition is used in combination with a filler is low, and thus the amount of the filler needs to be increased as in the related art, resulting in an increase in the specific gravity of the blend and a degradation of fuel efficiency. On the other hand, when the content of the syndiotactic 1,2-polybutadiene is greater than 40 wt %, the viscosity of the polymer increases, and thus it is difficult to carry out solidifying and mixing processes.

Meanwhile, the steps (a) to (c) may be carried out in situ. In the method of preparing a rubber composition according to one aspect of the present invention, a functional group having affinity for a filler may be imparted to the end of a conjugated diene-based polymer, which is a base rubber, and an additional amount of a conjugated diene-based monomer may be polymerized in situ such that syndiotactic 1,2-polybutadiene is dispersed in the base rubber. That is, the solvent used as a medium in the polymerization and end modification in the steps (a) and (b) is not removed but subsequently used as a medium for the polymerization of syndiotactic 1,2-polybutadiene in the step (c), so that the dispersibility of an end-modified conjugated diene-based polymer and syndiotactic 1,2-polybutadiene, which are included in a finally prepared rubber composition, may be significantly improved, and the effect of each of them may be harmoniously implemented.

The in situ method is also referred to as a one-pot reaction and means a method in which, when a target compound is synthesized through a reaction consisting of two or more steps, only one reactor is used, and a product(s) (intermediate product(s)) obtained in each step is/are not isolated and purified but only additional reactant(s) required for the subsequent step is/are introduced into the one reactor until the target compound is finally obtained.

When the steps (a) to (c) are carried out in situ, it is possible to prevent a material from being lost due to the processes of isolating and purifying an intermediate product (s). Therefore, as long as by-products do not interfere with a reaction in the subsequent step, use of the in situ method may result in improved processing efficiency and yield compared to when a method of isolating and purifying an intermediate product(s) to use it/them for a subsequent step is employed.

Hereinafter, embodiments of the present invention will be described in detail.

Example 1

1,3-Butadiene (15.6 mmols) and bis(tributylstannyl)acetylene (2.9 mmols) were mixed with a neodymium versatate (1.2 mmols) solution, and diisobutylaluminum hydride (15.9 mmols), triisobutylaluminum (16.2 mmols), and diethylaluminum chloride (3.2 mmols) were then added to the resulting solution to prepare a catalyst for polymerizing functionalized high-cis-1,4-polybutadiene. In this case, the monomeric neodymium versatate included neodymium in an amount of $1.5 \times 10^{-4}$ mol per 100 g thereof. After sufficiently inspiring nitrogen into a 10 L glass pressure reactor, 3,700 g of n-heptane was put in the reactor, and when the temperature inside the reactor reached 70° C., the catalyst and 400 g of 1,3-butadiene were added and stirred for 2 hours to induce polymerization. After the reaction was completed, 8.57 g of bis(2-ethylhexyl) phosphite was added to a first solution including functionalized high-cis-1,4-polybutadiene.

3.67 g of bis(2-ethylhexyl) phosphite, 1.94 g of iron(III) 2-ethylhexanoate, and n-heptane were mixed in a separate container to prepare a second solution. The second solution was put in the reactor and mixed with the first solution, 15.83 g of triisobutylaluminum was then added, and the temperature inside the reactor was adjusted to 70° C. When the temperature inside the reactor reached 70° C., additional 133 g of 1,3-butadiene was put in the reactor, followed by a polymerization reaction to prepare a third solution including functionalized high-cis-1,4-polybutadiene and syndiotactic 1,2-polybutadiene.

2.2 g of dibutylhydroxytoluene was added to the third solution, and the resulting solution was dried with steam to remove n-heptane and then roll-dried to prepare a rubber composition in which syndiotactic 1,2-polybutadiene was dispersed in a matrix including high-cis-1,4-polybutadiene whose end was modified with bis(tributylstannyl)acetylene.

It was confirmed using a differential scanning calorimeter (DSC) that the melting point of syndiotactic 1,2-polybutadiene included in the solidified rubber composition was 169° C.

Example 2

A rubber composition was prepared in the same manner as in Example 1 except that bis(tributylstannyl)acetylene (2.9 mmols) was changed to bis(N,N-bis(trimethylsilyl)amino)acetylene (2.9 mmols).

It was confirmed using a differential scanning calorimeter (DSC) that the melting point of syndiotactic 1,2-polybutadiene included in the solidified rubber composition was 167° C.

Example 3

A rubber composition was prepared in the same manner as in Example 1 except that bis(tributylstannyl)acetylene (2.9 mmols) was changed to N,N-bis(trimethylsilyl)amino-2-propyne (3.4 mmols).

It was confirmed using a differential scanning calorimeter (DSC) that the melting point of syndiotactic 1,2-polybutadiene included in the solidified rubber composition was 168° C.

Example 4

A rubber composition was prepared in the same manner as in Example 1 except that bis(tributylstannyl)acetylene (2.9 mmols) was changed to tributylstannyl-2-propyne (3.4 mmols).

It was confirmed using a differential scanning calorimeter (DSC) that the melting point of syndiotactic 1,2-polybutadiene included in the solidified rubber composition was 170° C.

Comparative Example 1,3-Butadiene (15.6 mmols) was mixed with a neodymium versatate (1.2 mmols) solution, and diisobutylaluminum hydride (15.9 mmols), triisobutylaluminum (16.2 mmols), and diethylaluminum chloride (3.2 mmols) were then added to the resulting solution to prepare a catalyst for polymerizing high-cis-1,4-polybutadiene. In this case, the monomeric neodymium versatate included neodymium in an amount of $1.5 \times 10^{-4}$ mol per 100 g thereof. After sufficiently inspiring nitrogen into a 10 L glass pressure reactor, 3,700 g of n-heptane was put in the reactor, and when the temperature inside the reactor reached 70° C., the catalyst and 400 g of 1,3-butadiene were added and stirred for 2 hours to induce polymerization. After the reaction was completed, 8.57 g of bis(2-ethylhexyl) phosphite was added to a first solution including high-cis-1,4-polybutadiene.

3.67 g of bis(2-ethylhexyl) phosphite, 1.94 g of iron(III) 2-ethylhexanoate, and n-heptane were mixed in a separate container to prepare a second solution. The second solution was put in the reactor and mixed with the first solution, 15.83 g of triisobutylaluminum was then added, and the temperature inside the reactor was adjusted to 70° C. When the temperature inside the reactor reached 70° C., additional 133 g of 1,3-butadiene was put in the reactor, followed by a polymerization reaction to prepare a third solution including high-cis-1,4-polybutadiene and syndiotactic 1,2-polybutadiene.

2.2 g of dibutylhydroxytoluene was added to the third solution, and the resulting solution was dried with steam to remove n-heptane and then roll-dried to prepare a rubber composition in which syndiotactic 1,2-polybutadiene was dispersed in a matrix including high-cis-1,4-polybutadiene.

It was confirmed using a differential scanning calorimeter (DSC) that the melting point of syndiotactic 1,2-polybutadiene included in the solidified rubber composition was 165° C.

Preparation Examples and Comparative Preparation Examples

Each of the rubber compositions according to Examples 1 to 4 and Comparative Example, a natural rubber, carbon black, zinc oxide, stearic acid, an antioxidant, sulfur, and a vulcanization accelerator were mixed together and stirred to prepare a blend. The blends including the rubber compositions according to Examples 1 to 4 and Comparative Example were named Preparation Examples 1 to 4 and Comparative Preparation Example, respectively, and the composition of each blend is shown in the following Table 1.

TABLE 1

| Composition | Preparation Example 1 | Preparation Example 2 | Preparation Example 3 | Preparation Example 4 | Comparative Preparation Example |
|---|---|---|---|---|---|
| Natural rubber | 50 | 50 | 50 | 50 | 50 |
| Example 1 | 50 | | | | |
| Example 2 | | 50 | | | |
| Example 3 | | | 50 | | |
| Example 4 | | | | 50 | |
| Comparative Example | | | | | 50 |
| Carbon black | 60 | 60 | 60 | 60 | 60 |
| Zinc oxide | 3 | 3 | 3 | 3 | 3 |
| Stearic acid | 2 | 2 | 2 | 2 | 2 |
| Antioxidant | 1.5 | 1.5 | 1.5 | 1.5 | 1.5 |
| Sulfur | 1.5 | 1.5 | 1.5 | 1.5 | 1.5 |
| Vulcanization accelerator | 1.5 | 1.5 | 1.5 | 1.5 | 1.5 |

(units: parts by weight)

Experimental Examples

1. Mooney Viscosity (cps)

30 g of each of the blends according to Preparation Examples and Comparative Preparation Example was pressed using a roller to prepare two samples with a thickness of 8 mm and an area of 5 cm×5 cm. The two samples were adhered to the front and rear of a rotor, and a rotational viscometer (MV 2000 Mooney Viscometer commercially available from Alpha Technologies) was used. The rotor was mounted on the rotational viscometer, and the rotor was operated after preheating to 100° C. for the first 1 minute to measure a change in viscosity of the blend for 4 minutes of operation, thereby obtaining a Mooney viscosity indicated by $ML_{1+4}$ (100° C.).

2. Other Properties

Each of the blends according to Preparation Examples and Comparative Preparation Example was subjected to roll mixing milling at 80° C. using a roll mill, processed into a flat sheet form on a roll with a thickness of 2 mm, and then maintained for 24 hours. Afterward, the resulting flat sheet was subjected to vulcanization using a press at 160° C. for a crosslinking time measured in a rubber process analyzer (RPA) to prepare a sheet sample with a thickness of 2 mm.

The mechanical/dynamic properties of the sheet samples were measured and compared, the results of which are shown in the following Table 2. The measurement methods of properties are as follows.

Hardness: measured in accordance with ASTM (Shore A)
300% modulus: determined by measuring stress which is being applied to the sample at the time of sample elongation by 300% at 25° C. (units: kgf/cm²)
Tensile strength: measured in accordance with ASTM D790 (units: kgf/cm²)
Elongation rate: determined by measuring the strain value (in %) until the sample is broken using a tensile testing machine.
Tan δ: measured by carrying out a temperature sweep at 60° C. using a dynamic mechanical thermal analyzer (DMTA)

TABLE 2

| Classification | Preparation Example 1 | Preparation Example 2 | Preparation Example 3 | Preparation Example 4 | Comparative Preparation Example |
|---|---|---|---|---|---|
| Mooney viscosity | 87 | 88 | 86 | 89 | 84 |
| Hardness | 69 | 70 | 69 | 70 | 69 |
| 300% modulus | 172.5 | 174.1 | 171.0 | 175.7 | 168.3 |
| Tensile strength | 240.3 | 243.5 | 238.8 | 245.2 | 234.3 |
| Elongation rate | 420.2 | 415.2 | 423.4 | 412.8 | 431.2 |
| Tanδ (60° C.) | 0.0943 | 0.0937 | 0.0949 | 0.0935 | 0.1095 |

Referring to Table 2, it can be seen that Preparation Examples 1 to 4, in which a rubber composition including high-cis-1,4-polybutadiene whose end was modified with an alkyne compound and syndiotactic 1,2-polybutadiene was used, exhibited excellent mechanical properties due to high modulus and high tensile strength and a low Tan δ (60° C.) value compared to Comparative Preparation Example including high-cis-1,4-polybutadiene whose end was not modified, indicating that the blend according to Preparation Examples 1 to 4 can be used to produce a tire with improved fuel efficiency.

In a method of preparing a rubber composition according to one aspect of the present invention, a functional group having affinity for a filler is imparted to the end of a conjugated diene-based polymer, which is a base rubber, and an additional amount of butadiene is polymerized in situ such that syndiotactic 1,2-polybutadiene is dispersed in the base rubber, and thereby the rubber composition is easily dispersed and processed.

In addition, since the crystallinity of syndiotactic 1,2-polybutadiene contributes to the strength of a product, when it is necessary to blend the rubber composition and a reinforcing filler, for example, when a tire is manufactured, a usage amount of the reinforcing filler can be reduced, and fuel efficiency of the product can be improved due to lower rolling resistance with the same level of strength.

Additionally, since syndiotactic 1,2-polybutadiene dispersed in the base rubber has a specific gravity lower than that of the reinforcing filler, it is possible to partially replace the reinforcing filler with syndiotactic 1,2-polybutadiene so that the weight of the tire can be reduced, and thus the fuel efficiency of the tire can be further improved.

Effects of the present invention are not limited to the above-described effects and it should be understood that all effects that can be inferred from a configuration of the invention disclosed in the detailed descriptions or claims of the present invention are encompassed.

The above description of the present invention is only exemplary, and it will be understood by those skilled in the art that various modifications can be made without departing from the scope of the present invention and changing essential features. Therefore, the above-described embodiments should be considered as only illustrative in all aspects and not for purposes of limitation. For example, each component described as a single body may be realized in a distributed manner, and similarly, components that are described as being distributed may be realized in a combined manner.

The scope of the present invention is defined by the appended claims and encompasses all modifications and alterations derived from meanings, the scope and equivalents of the appended claims.

What is claimed is:

1. A method of preparing a rubber composition, comprising:
   (a) reacting a conjugated diene-based monomer with one or more of compounds represented by the following Chemical Formulas 1 and 2 in the presence of a first catalyst;
   (b) adding a conjugated diene-based monomer to a product of the step (a) and inducing a reaction; and
   (c) adding a second catalyst and a conjugated diene-based monomer to a product of the step (b) and inducing a reaction:

  <Chemical Formula 1>

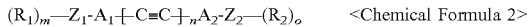  <Chemical Formula 2> wherein $R_1$ and $R_2$ each are a C1 to C20 alkyl, aryl, or alkoxy group, —NR'R", —SiR'R"R"', or hydrogen, wherein R', R", and R"' each are a C1 to C20 alkyl, aryl, or alkoxy group, or hydrogen, m and o each are an integer of 0 to 3, $Z_1$ and $Z_2$ each are silicon, tin, nitrogen, oxygen, sulfur, phosphorus, carbon, or hydrogen, $A_1$ and $A_2$ each are a C1 to C20 alkylene or arylene group, and n is an integer of 1 to 20.

2. The method of claim 1, wherein the first catalyst is a neodymium-based catalyst prepared from a monomeric neodymium salt compound.

3. The method of claim 2, wherein the monomeric neodymium salt compound is one or more selected from the group consisting of neodymium hexanoate, neodymium heptanoate, neodymium octanoate, neodymium octoate, neodymium naphthenate, neodymium stearate, neodymium versatate, neodymium bis(2-ethylhexyl) phosphate, neodymium bis(1-methylheptyl) phosphate, neodymium (mono-2-ethylhexyl-2-ethylhexyl) phosphonate, and neodymium bis(2-ethylhexyl) phosphite.

4. The method of claim 2, wherein, in the step (a), a molar ratio of the monomeric neodymium salt compound and the conjugated diene-based monomer is 1:5 to 30.

5. The method of claim 2, wherein, in the step (a), a molar ratio of the monomeric neodymium salt compound and each of the compounds represented by Chemical Formulas 1 and 2 is 1:1 to 10.

6. The method of claim 1, wherein each of the reacted and added conjugated diene-based monomer is one or more selected from the group consisting of 1,3-butadiene, isoprene, 2,3-dimethyl-1,3-butadiene, 2,3-dimethylbutadiene, 2-phenyl-1,3-butadiene, 2-chloro-1,3-butadiene, 1,3-pentadiene, 2-methyl-1,3-pentadiene, 3-methyl-1,3-pentadiene, 4-methyl-1,3-pentadiene, 1,3-hexadiene, 2-ethyl-1,3-butadiene, 2,4-hexadiene, and cyclo-1,3-hexadiene.

7. The method of claim 1, wherein the second catalyst includes an organoaluminum compound, a phosphorus compound, and a transition metal complex.

8. The method of claim 7, wherein the second catalyst includes 15 to 40 equivalents of the organoaluminum compound and 1 to 15 equivalents of the phosphorus compound with respect to 1 equivalent of the transition metal complex.

9. The method of claim 7, wherein the organoaluminum compound is one or more selected from the group consisting of trimethylaluminum, triethylaluminum, tripropylaluminum, tributylaluminum, triisobutylaluminum, trihexylaluminum, and diisobutylaluminum hydride.

10. The method of claim 7, wherein the phosphorus compound is a phosphite, a phosphate, or a mixture thereof.

11. The method of claim 7, wherein the transition metal complex is an iron carboxylate or an iron acetylacetonate.

12. The method of claim 1, wherein the steps (a) to (c) are carried out in situ.

13. The method of claim 1, wherein a product of the step (c) includes 60 to 90 wt % of an end-modified conjugated diene-based polymer and 10 to 40 wt % of syndiotactic 1,2-polybutadiene.